(12) United States Patent
Qiao et al.

(10) Patent No.: US 10,830,107 B2
(45) Date of Patent: Nov. 10, 2020

(54) NATURAL GAS COMBINED POWER GENERATION PROCESS WITH ZERO CARBON EMISSION

(71) Applicant: China University of Petroleum (East China), Qingdao (CN)

(72) Inventors: Yingyun Qiao, Qingdao (CN); Yuanyu Tian, Qingdao (CN); Kechang Xie, Qingdao (CN); Lanyi Sun, Qingdao (CN); Rui Liu, Qingdao (CN); Lichao Hu, Qingdao (CN); Ze Yang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/555,152

(22) Filed: Aug. 29, 2019

(65) Prior Publication Data

US 2020/0141282 A1 May 7, 2020

(30) Foreign Application Priority Data

Nov. 2, 2018 (CN) .......................... 2018 1 1300544

(51) Int. Cl.
*F01K 23/08* (2006.01)
*F02C 6/04* (2006.01)
*H02K 7/18* (2006.01)

(52) U.S. Cl.
CPC ................ *F01K 23/08* (2013.01); *F02C 6/04* (2013.01); *H02K 7/1823* (2013.01)

(58) Field of Classification Search
CPC .......... F01K 23/00; F01K 23/06; F01K 23/08; F01K 23/10; F01K 23/14; F01K 23/16; F01K 23/18; F02C 6/00; F02C 6/04
See application file for complete search history.

(56) References Cited

U.S. PATENT DOCUMENTS

| | | | |
|---|---|---|---|
| 8,596,075 B2 * | 12/2013 | Allam | F25J 3/04533 60/772 |
| 2016/0069262 A1 * | 3/2016 | Allam | C01B 32/50 60/783 |
| 2016/0134291 A1 * | 5/2016 | Fetvedt | H03L 5/02 700/282 |

* cited by examiner

Primary Examiner — Craig Kim
(74) Attorney, Agent, or Firm — Volpe Koenig

(57) ABSTRACT

A natural gas power generation process with zero carbon emission is described. The process includes pressurizing air and introducing the pressurized air into an air separation facility to obtain liquid oxygen and liquid nitrogen. The liquid oxygen is used for gasification and power generation. The liquid nitrogen is applied as a coolant of flue gas, and then for gasification and power generation.

11 Claims, 1 Drawing Sheet

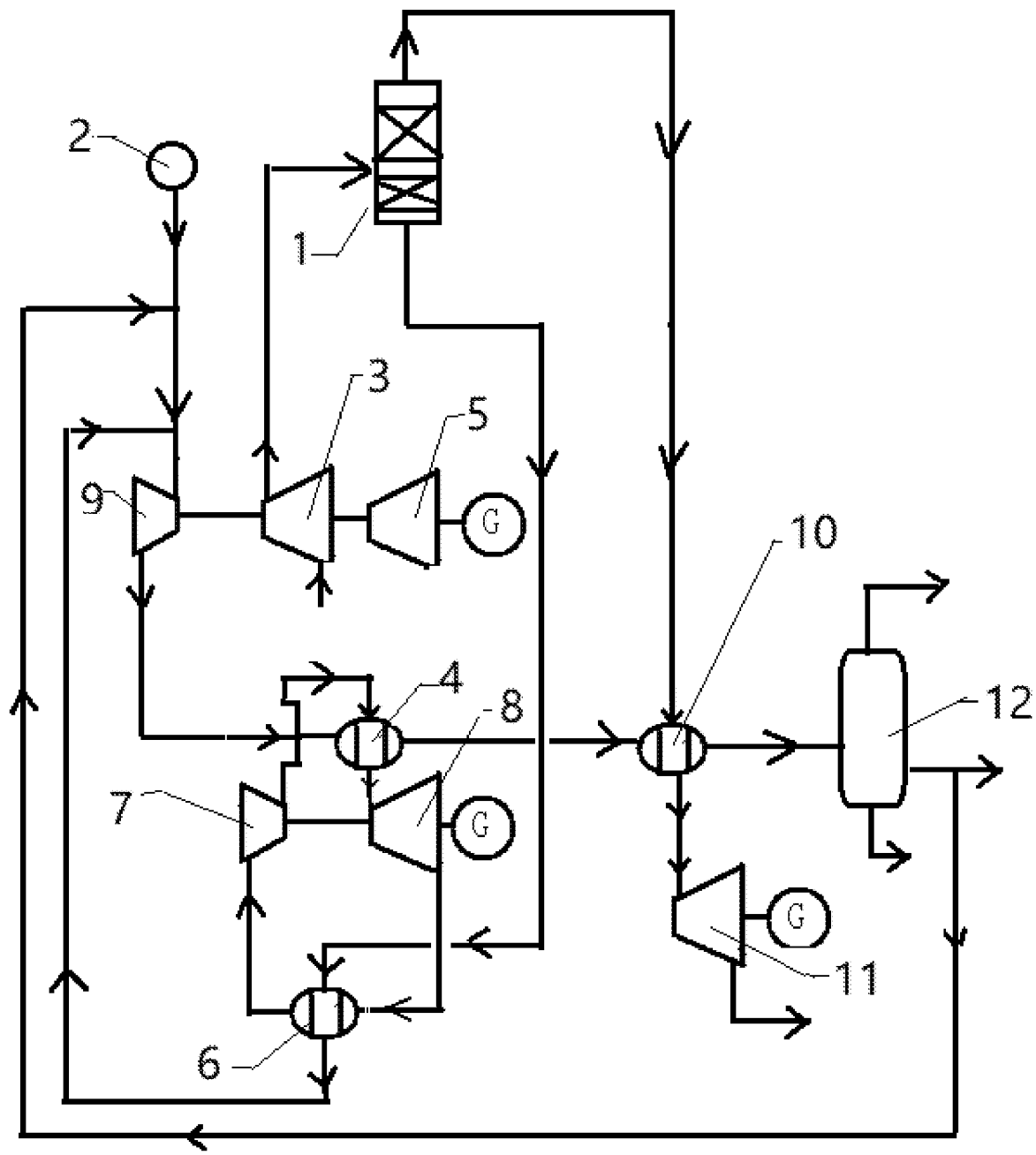

NATURAL GAS COMBINED POWER GENERATION PROCESS WITH ZERO CARBON EMISSION

CROSS REFERENCE TO RELATED APPLICATIONS

The application claims priority to Chinese Application No. 201811300544.4 filed on Nov. 2, 2018, entitled "A Natural Gas Combined Power Generation Process with Zero Carbon Emission for Peak Shaving", which is specifically and entirely incorporated herein by reference.

FIELD

The present disclosure relates to the technical field of natural gas power generation, and particularly relates to a natural gas combined power generation process with zero carbon emission.

BACKGROUND

Natural gas is regarded as one of the key clean energy sources in the world, it can be easily used and is particularly suitable for used as a distributed energy source and power generation by natural gas combusting. The natural gas for combustion scarcely produces fine dust (PM2.5), and low emission of the $SO_2$, and low emission of $NO_x$ after the natural gas passing through a low-nitrogen combustor and a flue gas denitrification devices, and its emission of greenhouse gas such as $CO_2$ is merely about half of the coal-fired power plants, its advantages in environmental protection are extremely prominent. In addition, the start-up and shutdown of the natural gas power plants are flexible, the natural gas power plants are suitable for peak shaving during peak period with high electricity load in the daytime and summer, their peak shaving and valley filling effect is very prominent.

The natural gas-fired power generation conventionally adopts the mode of fuel gas-steam combined cycle. The combined cycle power generation consists of the Brayton cycle and the Rankine cycle. At present, the inlet temperature of the combustion gas turbine may be as high as 1,300° C. or higher, the exhaust gas temperature is within a range of 500~600° C., the thermal efficiency of a simple cycle is as high as 45%~50%; the waste heat boiler is generally a dual pressure or a triple pressure system so as to further recover the waste heat and improve the thermal efficiency. In particular, the thermal efficiency of modern large-scale 9F fuel gas-steam combined cycle power generation reaches a high level of 58%~60%, which is much higher than the thermal efficiency of coal-fired power generation. The thermal efficiency of coal-fired generator set is generally within a range of 46%~48% even if the generator set is an ultra-supercritical generator set with an installed capacity of 600 MW or 1,000 MW, but its thermal efficiency still fall behind that of the natural gas-fired power generator set by 10~20 percentage.

The conventional natural gas combined power generation process is as follows: an air compressor inhales air from the external atmospheric environment, and pressurizes the air with a stepwise compression process by an axial air compressor to a pressure of 2.8 MPa, and the air temperature is increased accordingly; an excessive amount of compressed air with a pressure of 2.8 MPa is delivered under pressure to an air combustion chamber, it is mixed with the injected natural gas for combustion to generate high-temperature and high-pressure (HTHP) flue gas; then the HTHP flue gas enters a turbine to swell and work, drives the turbine to rotate the air compressor and the generator at high speed, performs the partial conversion of the chemical energy of the natural gas into mechanical energy, and outputs the electrical work; the high-temperature combustion flue gas then performs heat exchange in the waste heat steam boiler to produce high-pressure steam for driving a steam turbine to generate electricity, and finally the flue gas subjects to a denitrification process and is discharged in accordance with an ultra-low emission standard; when the peak shaving is performed, it is adjusted by the load fluctuation of a combustion gas turbine. In this way, the combustion gas turbine converts the chemical energy of the fuel into thermal energy and transforms some of the thermal energy into mechanical energy. Generally in the gas turbine, the air compressor is driven by the expansion and work of the combustion gas turbine, the air compressor is a load of the turbine. In a simple cycle, about ½ to ⅔ of the mechanical work generated from the turbine serves to drive the air compressor, and the remaining ⅓ of the mechanical work is used for driving the generator. When the combustion gas turbine starts, it initially requires an external power. It is general practice that a starting engine drives the air compressor until the mechanical work generated by the combustion gas turbine is greater than the mechanical work consumed by the air compressor, the external starting engine decouples, the combustion gas turbine can operate independently by per se.

With the rapid development and mutual promotion of renewable energy and energy storage technologies, the power system evolves towards the diversified smart energy system with a co-existence of large-scale and concentrated power plants and wide distribution in the future; in order to meet the coordinated regulation in response to the climate change and air pollution control, the combustion gas combined power plants utilizing natural gas as the raw material are mainly used as the distributed power source for peak shaving of the power grid, but the existing natural gas combined power generation technology has the defects such as high cost of $CO_2$ capture and utilization, high water consumption, power generation efficiency has room for further improvement, small range of peak load adjustment capacity, high temperature of the exhaust gas, and difficult in reducing emission of $NO_x$.

At present, the daily electricity load is fluctuating, and the peak-valley difference is gradually increasing. For the sake of meeting the power demand, the current power generation installed capacity and power grid capacity need to be built according to the maximum demand, resulting in the shutdown of generator set or operation with low load when power consumption is in a valley, as well as waste of the power grid capacity. The energy storage and peak shaving technologies mainly comprise three modes, namely water storage for energy storage, compressed air for energy storage and electricity storage for energy storage. The water storage for energy storage is currently the main mode of large-scale energy storage projects, but it has defects that the projects require a high potential difference, a vast floor space and a large sum of investment. In the field of large-scale energy storage, the compressed air for energy storage is a desirable method of energy storage, which uses air compressors to convert the discarded light source, abandoned wind power, wasted hydropower or low valley electricity into molecular potential energy and store it in a pressurized gas storage device. When it is required to generate electricity, the turbine is driven by the release of high-pressure air to boost one or more generators to generate electricity. However, the compressed air currently studied has defects in three aspects: (1) it relies on fossil fuels such as natural gas to provide a heat source, and is not suitable for countries "lacking oil and gas"; (2) the energy storage capacity per unit volume is small, it requires special geographical conditions to build large gas storage chambers, such as the rock caves, salt caves, abandoned mines and the like with high airtightness; (3) the system efficiency is relatively low (42%~54%), which shall be further improved.

SUMMARY

The present disclosure aims to overcome the deficiencies of the conventional natural gas combined power generation technologies and provide a natural gas combined power generation process with zero carbon emission; the power generation process provided by the present disclosure not only solves difficult problems of the existing natural gas combined power generation technology, such as the high water consumption, low power generation efficiency and small range of peak load adjustment capacity; but also can perform energy storage with high unit volume compressed air, high conversion efficiency; in addition, it may greatly reduce the load of the air compressor, perform $CO_2$ capture and utilization with low-cost, zero $NO_x$ emission and discharging flue gas at a normal temperature, thereby improve the power generation efficiency significantly.

The present disclosure provides a natural gas combined power generation process with zero carbon emission, the process comprising:
1) pressurizing the air with an air compressor to a pressure of 0.4~0.8 MPa, and then introducing the pressurized air into an air separation facility for performing air separation to obtain liquid oxygen and liquid nitrogen;
2) performing heat exchange at a cooler between the liquid oxygen and the high-temperature $CO_2$ at an outlet of a supercritical $CO_2$ generator, so as to generate high-pressure vaporized oxygen and recyclable $CO_2$;
3) combusting the high-pressure vaporized oxygen and natural gas, and the obtained high-temperature combustion flue gas drives an air compressor and a generator to generate electricity;
4) subjecting the high-temperature combustion flue gas obtained in step 3) to a heat exchange in a $CO_2$ waste heat boiler to perform a supercritical $CO_2$ power generation;
5) performing heat exchange of the heat exchanged combustion flue gas obtained in step 4) with liquid nitrogen through a vaporizer, and the vaporization of liquid nitrogen drives a nitrogen turbine generator to generate electricity.

The natural gas combined power generation process with zero carbon emission provided by the present disclosure has the following advantages:
1) the natural gas combined power generation process with zero carbon emission provided by the present disclosure can perform peak shaving and power generation, the liquid nitrogen and a part of the liquid oxygen separated during the valley period with low electricity load (e.g., at nighttime) can be stored and supplied in use during the peak period with high electricity load (e.g., in the daytime). Specifically, during the peak period of power grid operation with high electricity load in the daytime, the liquid nitrogen stored at nighttime and separated in the daytime is pumped and pressurized, and then subjects to heat exchange and vaporization for power generation; the liquid oxygen stored at nighttime and separated in the daytime is pumped and pressurized, and then subjects to heat exchange and vaporization for use in a combustion gas turbine to perform peak shaving and power generation in response to the load fluctuation;
2) the present disclosure may improve natural gas combined power generation efficiency and peak shaving capability by means of coupling a series of technologies, such as using the liquid oxygen derived from air separation as a coolant for supercritical $CO_2$ power generation and the subsequent natural gas power generation, employing the waste heat of high-temperature flue gas in the supercritical $CO_2$ power generation, utilizing the liquid nitrogen as a coolant of flue gas, thereby achieve the clean and efficient power generation with zero pollution of $NO_x$, low water consumption and zero carbon emissions.

BRIEF DESCRIPTION OF THE DRAWINGS

The drawings provide reference to facilitate further understanding of the present disclosure, and constitute a part of the description, it serves to illustrate the present disclosure along with the following specific embodiments, but the drawings do not impose limitation on the present disclosure. In the drawings:

FIG. 1 is a schematic diagram of a natural gas combined power generation process with zero carbon emission according to a specific embodiment of the present disclosure.

DESCRIPTION OF THE REFERENCE SIGNS

| 1. air separation facility | 2. natural gas pressure tank | 3. air compressor |
|---|---|---|
| 4. $CO_2$ waste heat boiler | 5. generator | 6. cooler |
| 7. $CO_2$ compressor | 8. supercritical $CO_2$ generator | 9. combustion gas turbine |
| 10. vaporizer | 11. nitrogen turbine generator | 12. flue gas distillation tower |

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As illustrated in FIG. 1, the present disclosure provides a natural gas combined power generation process with zero carbon emission, the process comprising:
1) pressurizing the air with an air compressor to a pressure of 0.4~0.8 MPa, and then introducing the pressurized air into an air separation facility for performing air separation to obtain liquid oxygen and liquid nitrogen;
2) performing heat exchange at a cooler between the liquid oxygen and the high-temperature $CO_2$ at an outlet of a supercritical $CO_2$ generator, so as to generate high-pressure vaporized oxygen and recyclable $CO_2$;
3) combusting the high-pressure vaporized oxygen and natural gas, and the obtained high-temperature combustion flue gas drives an air compressor and a generator to generate electricity;

4) subjecting the high-temperature combustion flue gas obtained in step 3) to a heat exchange in a $CO_2$ waste heat boiler to perform a supercritical $CO_2$ power generation;

5) performing heat exchange of the heat exchanged combustion flue gas obtained in step 4) with liquid nitrogen through a vaporizer, and the vaporization of liquid nitrogen drives a nitrogen turbine generator to generate electricity.

The power generation process provided by the present disclosure does not require to pressurize air to a pressure of 2.8 MPa, which reduces energy consumption. Specifically, the air compressor may be an axial flow air compressor, and in step 1) the air compressor inhales air from the external atmospheric environment and pressurizes the air with a stepwise compression process by a an axial air compressor to a pressure of 0.4~0.8 MPa. At the same time, the air temperature is also increased accordingly for preheating liquid oxygen.

According to the present disclosure, the air separation is preferably a cryogenic air separation, a cascade air separation combined with pressure swing adsorption separation and cryogenic separation or a cascade air separation combined with membrane separation and cryogenic separation. The specific operation of the air separation may be carried out according to the conventional techniques in the art, and the present disclosure is not particularly limited thereto. The pressurized liquid oxygen is pumped for heat exchange and cooling of the supercritical $CO_2$ power generation, and the liquid oxygen exchanges heat in the cooler with the high-temperature $CO_2$ at the supercritical $CO_2$ generator outlet for the supercritical $CO_2$ power generation, so as to obtain the high-pressure vaporized oxygen and recyclable $CO_2$. The high-pressure vaporized oxygen is used for natural gas power generation, that is, the high-pressure vaporized oxygen and natural gas are combusting, and the obtained high-temperature combustion flue gas drives the air compressor and the generator to generate electricity.

The supercritical $CO_2$ power generation according to the present disclosure may be a variety of power generation modes conventionally used in the art, preferably, the supercritical $CO_2$ power generation is one of a supercritical $CO_2$ power generation mode of a recompression cycle, a segment expansion cycle, a preload cycle, and a partial cooling cycle.

According to the present disclosure, "subjecting the high-temperature combustion flue gas obtained in step 3) to a heat exchange in a $CO_2$ waste heat boiler to perform a supercritical $CO_2$ power generation" particularly refers to that the supercritical $CO_2$ pressurized by the $CO_2$ compressor exchanges heat in a $CO_2$ waste heat boiler with the high-temperature combustion flue gas obtained in step 3), the heat exchanged working medium enters the supercritical $CO_2$ generator for performing supercritical $CO_2$ power generation.

According to a preferred embodiment of the present disclosure, the supercritical $CO_2$ power generation comprises: supercritical $CO_2$ is pressurized by a $CO_2$ compressor, and then performs heat exchange in a $CO_2$ waste heat boiler with the high-temperature combustion flue gas obtained in step 3); the heat exchanged working medium enters the supercritical $CO_2$ generator for performing the supercritical $CO_2$ power generation; the high-temperature $CO_2$ at an outlet of the supercritical $CO_2$ generator performs heat exchange in the cooler with the liquid oxygen, and the obtained recyclable $CO_2$ is delivered to the $CO_2$ compressor.

According to the power generation process provided by the present disclosure, preferably, the supercritical $CO_2$ pressure is within a range of 7~40 MPa, and further preferably, the supercritical $CO_2$ pressure is within a range of 12~25 MPa.

In the power generation process provided by the present disclosure, the liquid oxygen may be used as a coolant in the supercritical $CO_2$ power generation process, and may be used for natural gas power generation after heat exchange, the obtained high-temperature combustion flue gas exchanges heat in a $CO_2$ waste heat boiler with the $CO_2$ pressurized by a $CO_2$ compressor, so as to provide heat to the $CO_2$ pressurized by the $CO_2$ compressor, and the heat exchanged working medium enters the supercritical $CO_2$ generator for performing supercritical $CO_2$ power generation. The power generation process provided by the present disclosure can realize efficient utilization of energy and save energy.

According to the present disclosure, the liquid nitrogen obtained in step 1) may be stored during the valley period with low electricity load (e.g., at nighttime), and then during the peak period with high electricity load (e.g., in the daytime), the heat exchange of the heat exchanged combustion flue gas obtained in step 4) with the liquid nitrogen may be performed through a vaporizer, the vaporization of liquid nitrogen drives a nitrogen turbine generator to generate electricity. The power generation process provided by the present disclosure can perform peak shaving and power generation.

According to a preferred embodiment of the present disclosure, the stepwise cooled flue gas obtained in step 5) is dehydrated, and the dehydrated flue gas is pumped to a flue gas distillation tower to separate and recover $CO_2$. The stepwise cooled flue gas refers to that the flue gas obtained from the high-temperature combustion flue gas which performs heat exchange (first level cooling) in the $CO_2$ waste heat boiler, and the heat exchanged flue gas then perform heat exchange in a vaporizer with the liquid nitrogen (second level cooling). The present disclosure does not impose a specific definition on the dehydration mode, the dehydration may be carried out according to a variety of technical means conventionally used in the art.

According to a specific embodiment of the present disclosure, in step 3), the high-pressure vaporized oxygen and the natural gas jointly enter the combustion gas turbine, the obtained high-temperature combustion flue gas enters the turbine, so as to drive the turbine to move the air compressor and the generator to generate electricity.

According to a preferred embodiment of the present disclosure, at least a part of the recovered $CO_2$ is recycled to the step 3) for combustion along with the high-pressure vaporized oxygen and natural gas. At least a part of the recovered $CO_2$ is returned to the combustion gas turbine as a feed material for circulation and temperature control.

According to a preferred embodiment of the present disclosure, the mass ratio of the high-pressure vaporized oxygen relative to the recovered $CO_2$ recycled to step 3) is 1: (2~12), further preferably 1: (5~8).

According to a preferred embodiment of the present disclosure, at least a part of recovered $CO_2$ is used in replenishment of working medium for supercritical $CO_2$ power generation. The present disclosure does not impose a specific limitation on the specific amount of recovered $CO_2$ used in the supercritical $CO_2$ power generation for the replenishment of the working medium and the skilled person in the art may appropriately select it according to the specific operation conditions.

The recovered $CO_2$ can also be sold outward as a liquid $CO_2$ product.

According to a specific embodiment of the present disclosure, the natural gas combined power generation process with zero carbon emission provided by the present disclosure comprises: an air compressor inhales air from an external atmospheric environment, and pressurizes the air with a stepwise compression process by an axial air compressor to a pressure of 0.4~0.8 MPa, and the air temperature is increased accordingly for preheating liquid oxygen; the pressurized air with a pressure of 0.4~0.8 MPa is introduced into an air separation facility for performing air separation to obtain liquid oxygen and liquid nitrogen; the pressurized liquid oxygen is pumped for performing heat exchange with the supercritical $CO_2$ and cooling and power generation, the pressurized liquid nitrogen is pumped as a flue gas coolant for performing heat exchange, then vaporization and power generation, the liquid nitrogen and a part of liquid oxygen separated at night are supplied for use during a peak period with high electricity load in the daytime; the high-pressure vaporized oxygen subjects to heat exchange through a supercritical $CO_2$ cooler, and then blends with high-pressure recyclable $CO_2$ and the injected natural gas for combustion, the high-temperature combustion flue gas then enters a turbine to swell and work, drives the turbine to rotate the air compressor and the generator at high speed, performs the partial conversion of the chemical energy of the natural gas into mechanical work, and outputs the electrical work; the high-temperature combustion flue gas then performs heat exchange in the $CO_2$ waste heat boiler to carry out the supercritical $CO_2$ power generation, its coolant is pressurized liquid oxygen, the cooled supercritical $CO_2$ circulates through a $CO_2$ compressor; the heat exchanged flue gas performs heat exchange with pressurized liquid nitrogen, the liquid nitrogen is vaporized to drive a nitrogen turbine generator to generate electricity, the stepwise cooled flue gas is dehydrated, the liquid flue gas passes through a distillation tower to separate and recover $CO_2$, a part of $CO_2$ returns to the combustion gas turbine as a feed material for circulation and temperature control, another part of $CO_2$ is used for replenishment of work medium for performing supercritical $CO_2$ power generation, and a remaining part of $CO_2$ is sold outward as liquid $CO_2$ product; during a peak period of high electricity load in the daytime, the liquid nitrogen stored at night and separated in the daytime is pumped and pressurized, and then exchanges heat and vaporizes for power generation, the liquid oxygen stored at night and separated in the daytime is pumped and pressurized, and subsequently exchanges heat and vaporizes for use in a combustion gas turbine to perform peak shaving and power generation in response to the load fluctuation.

The present disclosure will be described in detail below with reference to examples.

EXAMPLE 1

1) As shown in FIG. 1, an air compressor inhales air from an external atmospheric environment, and pressurizes the air with a stepwise compression process by an air compressor (3) to a pressure of 0.4~0.8 MPa, and the air temperature is increased accordingly for preheating liquid oxygen; the pressurized air with a pressure of 0.4~0.8 MPa is introduced into an air separation facility (1) for performing air separation to obtain liquid oxygen and liquid nitrogen. The liquid oxygen is used for performing heat exchange and cooling of the supercritical $CO_2$ and power generation, the liquid oxygen exchanges heat in a cooler (6) with the high-temperature $CO_2$ at an outlet of the supercritical $CO_2$ generator (8) performing the supercritical $CO_2$ power generation, so as to obtain the high-pressure vaporized oxygen and the recyclable $CO_2$, the coolant in the cooler (6) is liquid oxygen; the high-pressure vaporized oxygen and the natural gas jointly enter the combustion gas turbine (9) for performing combustion, the obtained high-temperature combustion flue gas enters a turbine to drive the air compressor (3) and a generator (5) to rotate at a high speed, performs the partial conversion of the chemical energy of the natural gas into mechanical work, and outputs the electrical work. The high-temperature combustion flue gas obtained from the combustion of the high-pressure vaporized oxygen and the natural gas subsequently performs heat exchange in a $CO_2$ waste heat boiler (4) to carry out the supercritical $CO_2$ power generation.

The supercritical $CO_2$ power generation includes: the supercritical $CO_2$ is pressurized by a $CO_2$ compressor (7), and then exchanges heat in the $CO_2$ waste heat boiler (4) with the high-temperature combustion flue gas obtained above; the heat exchanged working medium enters the supercritical $CO_2$ generator (8) to perform the supercritical $CO_2$ power generation; the high-temperature $CO_2$ at the outlet of the supercritical $CO_2$ generator (8) and the liquid oxygen perform heat exchange in a cooler (6) for supercritical $CO_2$ power generation, the obtained recyclable $CO_2$ is circulated to the $CO_2$ compressor (7).

The combustion flue gas following a heat exchange in the $CO_2$ waste heat boiler (4) performs heat exchange with the above liquid nitrogen through a vaporizer (10), the liquid nitrogen vaporizes to drive a nitrogen turbine generator (11) to generate electricity.

The stepwise cooled flue gas is dehydrated, and the dehydrated liquid flue gas passes through a flue gas distillation tower (12) to separate and recover $CO_2$, a part of the recovered $CO_2$ returns to a combustion gas turbine (9) as a feeding material for circulation and temperature control, another part of the recovered $CO_2$ is used for replenishment of the working medium for supercritical $CO_2$ power generation, and a remaining part of the recovered $CO_2$ is sold outward as a liquid $CO_2$ product.

The liquid nitrogen and a part of the liquid oxygen obtained from air separation may be stored during the valley period with low electricity load (e.g., at nighttime) so as to be supplied in use during the peak period with high electricity load in the daytime. Specifically, during the peak period of power grid operation with high electricity load (e.g., in the daytime), the liquid nitrogen stored at nighttime and separated in the daytime may be pumped and pressurized, and then subjects to heat exchange and vaporization in a vaporizer (10) for power generation; the liquid oxygen stored at nighttime and separated in the daytime is pumped and pressurized, and subsequently subjects to heat exchange and vaporization for use in a combustion gas turbine (9) to perform peak shaving and power generation in response to the load fluctuation.

The natural gas combined power generation process with zero carbon emission provided by the present disclosure can be used for peak shaving and power generation. According to an Aspen simulation result, the power generation process provided by the present disclosure only needs to pressurize the air to a pressure of 0.4~0.8 MPa, while prior art needs to pressurize the air to a pressure of about 2.8 MPa. The power generation process provided by the present disclosure greatly reduces a ratio of the energy consumption of the natural gas combustion gas turbine for the air compressor from ½~⅔ to about 10%; the natural gas and the high-pressure recyclable $CO_2$ blend with oxygen to assist combustion and power generation, such that the specific volume of the flue gas is increased, and the power generation efficiency of the combustion gas turbine is relatively improved; the combustion flue gas uses supercritical $CO_2$ for power generation and utilizes the liquid nitrogen vaporization turbine generator for generating electricity thereby form a combined system, the temperature of the exhaust flue gas is reduced from about 140° C. in the prior art to about 30° C., and the energy recovery rate is greatly increased; the flue gas can be easily dehydrated and separated to obtain $CO_2$, the energy consumption of $CO_2$ capture is significantly reduced; the problem concerning high water consumption of natural gas power generation is solved due to the $CO_2$ circulation and temperature control of the combustion gas turbine, the supercritical $CO_2$ applied as a work medium of waste heat power generation, the dehydration of flue gas at a low temperature and a recyclable utilization of the dehydrated water, thus the process is especially suitable for water-deficient areas; in addition, the oxygen-aided combustion in the combustion gas turbine along with the $CO_2$ circulation and temperature control avoids the $NO_x$ emission of the existing natural gas power plants, and significantly reduces the emission of smoke dust and SOx, thereby perform a clean and efficient natural gas power generation with zero carbon emission; moreover, the air separation components are respectively utilized, the liquid nitrogen is used for energy storage and peak shaving, the demand of gas storage volume is greatly reduced, the energy consumption derived from the air storage volume requirement is reduced by more than 20 times as compared with the large-scale air compression and energy storage in the prior art, the energy storage efficiency is high, thus satisfying the demand of the peak shaving and valley filling of the natural gas distributed energy power plants in the future.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A natural gas combined power generation process with zero carbon emission, the process comprising:
   1) pressurizing air with an air compressor to a pressure of 0.4~0.8 MPa, and then introducing the pressurized air into an air separation facility for performing air separation to obtain liquid oxygen and liquid nitrogen;
   2) performing heat exchange at a cooler between the liquid oxygen and a high-temperature $CO_2$ at an outlet of a supercritical $CO_2$ generator, so as to generate high-pressure vaporized oxygen and recyclable $CO_2$;
   3) combusting the high-pressure vaporized oxygen and natural gas, and obtained high-temperature combustion flue gas drives the air compressor and a generator to generate electricity;
   4) subjecting the high-temperature combustion flue gas obtained in step 3) to a heat exchange in a $CO_2$ waste heat boiler to perform a supercritical $CO_2$ power generation;
   5) performing heat exchange of the heat exchanged combustion flue gas obtained in step 4) with liquid nitrogen through a vaporizer to obtain a stepwise cooled flue gas, and the vaporization of liquid nitrogen drives a nitrogen turbine generator to generate electricity.

2. The natural gas combined power generation process with zero carbon emission according to claim 1, wherein the stepwise cooled flue gas obtained in step 5) is dehydrated, and the dehydrated flue gas is pumped to a flue gas distillation tower to separate and recover $CO_2$.

3. The natural gas combined power generation process with zero carbon emission according to claim 2, wherein at least a part of the recovered $CO_2$ is recycled to the step 3) for combustion along with the high-pressure vaporized oxygen and natural gas.

4. The natural gas combined power generation process with zero carbon emission according to claim 3, wherein a mass ratio of the high-pressure vaporized oxygen relative to the recovered $CO_2$ recycled to step 3) is 1:(2~12).

5. The natural gas combined power generation process with zero carbon emission according to claim 4, wherein the mass ratio of the high-pressure vaporized oxygen relative to the recovered $CO_2$ recycled to step 3) is 1:(5~8).

6. The natural gas combined power generation process with zero carbon emission according to claim 2, wherein at least a part of the recovered $CO_2$ is used in replenishment of working medium for supercritical $CO_2$ power generation.

7. The natural gas combined power generation process with zero carbon emission according to claim 1, wherein the air separation is a cryogenic air separation, a cascade air separation combined with pressure swing adsorption separation and cryogenic separation or a cascade air separation combined with membrane separation and cryogenic separation.

8. The natural gas combined power generation process with zero carbon emission according to claim 1, wherein the supercritical $CO_2$ power generation is one of a supercritical $CO_2$ power generation mode of a recompression cycle, a segment expansion cycle, a preload cycle, and a partial cooling cycle.

9. The natural gas combined power generation process with zero carbon emission according to claim 1, wherein the supercritical $CO_2$ power generation comprises:
   supercritical $CO_2$ is pressurized by a $CO_2$ compressor, and then performs heat exchange in a $CO_2$ waste heat boiler with the high-temperature combustion flue gas obtained in step 3); the heat exchanged working medium enters the supercritical $CO_2$ generator for performing the supercritical $CO_2$ power generation; the high-temperature $CO_2$ at an outlet of the supercritical $CO_2$ generator performs heat exchange in the cooler with the liquid oxygen, and the obtained recyclable $CO_2$ is delivered to the $CO_2$ compressor.

10. The natural gas combined power generation process with zero carbon emission according to claim 9, wherein the supercritical $CO_2$ pressure is within a range of 7~40 MPa.

11. The natural gas combined power generation process with zero carbon emission according to claim 9, wherein the supercritical $CO_2$ pressure is within a range of 12~25 MPa.

* * * * *